United States Patent Office 3,661,902
Patented May 9, 1972

3,661,902
N-SUBSTITUTED PIPERIDINE SPIRO COMPOUNDS
Michio Nakanishi, Oita, and Katsuo Arimura and Tadao Okada, Fukuoka, Japan, assignors to Yoshitomi Pharmaceutical Industries, Ltd., Osaka, Japan
No Drawing. Continuation-in-part of application Ser. No. 752,497, Aug. 14, 1968. This application Sept. 2, 1970, Ser. No. 69,154
Claims priority, application Japan, Aug. 16, 1967, 42/52,529
Int. Cl. C07d 29/20, 93/06
U.S. Cl. 260—243 R       15 Claims

ABSTRACT OF THE DISCLOSURE

Compounds of the formula

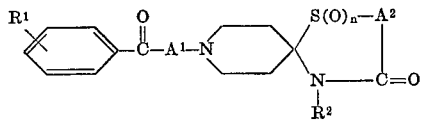

and pharmaceutically acceptable acid addition salts thereof are antipsychotic agents, useful in the therapy of schizophrenia and mania. In the formula $R^1$=H, halogen, lower alkyl or lower alkoxy;
$R^2$=H, lower alkyl, phenyl, halophenyl, methylphenyl or trifluoromethylphenyl;
$A^1$=alkylene of 1 to 3 carbon atoms;
$A^2$=alkylene of 1 to 2 carbon atoms; and
$n$=0, 1 or 2.

---

This application is a continuation-in-part of Ser. No. 752,497, filed Aug. 14, 1968, now abandoned.

This invention relates to novel N-substituted piperidine spiro compounds.

More particularly, the invention relates to N-substituted piperidine spiro compounds of the formula

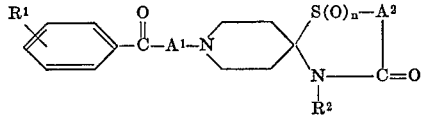

(I)

wherein $R^1$ is H, halogen (e.g. F, Br or Cl), or alkyl or alkoxy of up to 3 carbon atoms, $R^2$ is H, alkyl of 1 to 4 carbon atoms, phenyl or substituted phenyl in which the substituent is halogen (e.g. F, Br or Cl), methyl or trifluoromethyl, $A^1$ is alkylene of 1 to 3 carbon atoms, $A^2$ is alkylene of 1 to 2 carbon atoms (i.e. methylene, ethylene or ethylidene), and $n$ is 0 or the integer 1 or 2, and pharmaceutically acceptable acid addition salts thereof.

An object of the present invention is to provide novel N-substituted piperidine spiro compounds of Formula I and pharmaceutically acceptable acid addition salts thereof, which are useful, for example, as antipsychotic agents.

A further object of the invention is to provide an antipsychotic composition comprising a novel N-substituted piperidine spiro compound of the Formula I or a pharmaceutically acceptable acid addition salt thereof.

The N-substituted piperidine spiro compounds I are prepared by reacting a compound of the formula

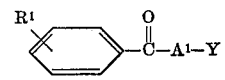

(II)

with a compound of the formula

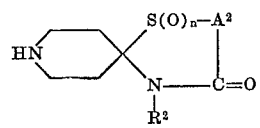

(III)

or an acid adition salt thereof, e.g. the hydrohalide, wherein $R^1$, $R^2$, $A^1$, $A^2$ and $n$ are as defined above, and Y is a reactive radical (optimally a halogen, e.g. Cl, Br or I, or reactive acid residue, e.g. methylsulfonyloxy or p-tolylsulfonyloxy).

The starting compound III wherein $n$ is 0 is prepared, for example, by the method described in Belgian Pat. No. 708,051. Oxidation of thus-prepared 1-thia compound with about an equimolar proportion of hydrogen peroxide in glacial acetic acid gives the corresponding sulfoxide (i.e. the compound III wherein $n$ is 1). The sulfone (i.e. the compound III wherein $n$ is 2) is produced, for example, by further oxidation of the 1-thia compound with an excess of the oxidizing agent.

The reaction of the present invention is advantageously carried out in a solvent in the presence of an acid acceptor. Examples of the solvent include alcohols, amides, ketones, aromatic hydrocarbons, ethers and esters. Examples of the acid acceptor are alkali carbonates, alkali hydyrogen carbonates, alkali hydroxides, alkali alcoholates, triethylamine, diethylaniline, dimethylaniline and pyridine. Preferably, the reaction is carried out at about the boiling point of the solvent employed. In case an aprotic polar solvent such as dimethylformamide or dimethyl sulfoxide is used as solvent, the reaction may be carried out at about 30° to about 100° C. The reaction of the method of the present invention may be accelerated by the use of an alkali iodide (e.g. sodium iodide or potassium iodide) as catalyst.

Thus-produced N-substituted piperidine spiro compounds represented by the Formula I have a tertiary nitrogen atom in the piperidine ring, and therefore can form acid addition salts with various inorganic or organic acids such as hydrochloric, hydrobromic, sulfuric, nitric, oxalic, maleic, fumaric, tartaric, malonic acid and so on. Furthermore, the spiro linkage of these compounds is stable in the free base, as well as in the acid addition salt.

N-substituted piperidine spiro compounds represented by the Formula I as well as their pharmaceutically acceptable salts are useful as antipsychotic agents. For example, 8-(4-p - fluorophenyl-4-oxobutyl)-3-oxo-1-thia-4,8-diazaspiro[4.5]decane (Compound A as the hydrochloride), 8 - (4-p-fluorophenyl-4-oxo-butyl)-4-methyl-3-oxo-1-thia-4,8-diazaspiro[4.5]decane (Compound B as the hydrochloride), 2 - methyl-3-oxo-8-(4-phenyl-4-oxobutyl)-1-thia-4,8-diazaspiro[4.5]decane (Compound C as the hydrogen maleate), 8-(4-p-fluorophenyl-4-oxobutyl)-3-oxo-1-thia-4, 8-diazaspiro[4.5]decane-1,1-dioxide (Compound D as the hydrochloride) and 9-(4-p-fluorophenyl-4-oxobutyl)-4-oxo-1-thia - 5,9 - diazaspiro[5.5]undecane (Compound E as the hydrogen maleate) have the following pharmacological properties (given in terms of median effective dose ($ED_{50}$ in intraperitoneal administration) in mg./kg. and median lethal dose ($LD_{50}$) in mg./kg.):

| Test compound | A | B | C | D | E |
|---|---|---|---|---|---|
| Suppression of spontaneous motility [1] (mouse) | <20 | <20 | <20 | <20 | <20 |
| Suppression of fighting activity [2] (mouse) | 20 | 80 | 40 | 40 | 80 |
| Intraperitoneal toxicity (mouse) | 320 | 160 | 320 | 320 | 320 |

[1] Observed according to the method described by P. B. Dews in British Journal of Pharmacology, vol. 8, p. 46ff. (1953).
[2] Observed according to the method described by R. E. Tedeschi et al. in Journal of Pharmacology and Experimental Therapeutics, vol. 125, p. 28ff. (1959).

Owing to the low toxicity and strong effect for suppression of spontaneous motility and fighting activity, the compounds I of the invention and pharmaceutically acceptable salts thereof can be administered safely per se as antipsychotic agents, or in the form of a pharmaceutical composition in admixture with a suitable and conventional pharmaceutically acceptable carrier or adjuvant, e.g. starch, and can be administered orally or by way of injection, without harm to the host.

The pharmaceutical composition can take the form of tablets, granules, powders, capsules or injections and can be administered orally, subcutaneously or intramuscularly. Usual daily dosages of the compound I or salt thereof lie in the range of about 25 to about 200 milligrams per human adult. Thus, in case of tablets each containing 25 milligrams of the compound I or salt thereof, one to eight tablets per day are administered.

These compositions are especially useful for the treatment of schizophrenia and mania.

In the following illustrative examples, "g." stands for "gram(s)" and "ml." for "milliliter(s)."

EXAMPLE 1

To a suspension of 6.1 g. of 3-oxo-1-thia-4,8-diazaspiro[4.5]decane hydrobromide and 5 g. of sodium carbonate in 250 ml. of dimethylformamide is added 4.4 g. of 4-p-fluorophenyl-4-oxobutyl chloride, and the mixture is heated at 90° to 95° C. for 14 hours with stirring. The reaction mixture is filtered to remove insoluble matter, and the filtrate is concentrated in vacuo. To the red-brown residue are added 300 ml. of chloroform and 80 ml. of water. After shaking, the chloroform layer is separated and washed with 80 ml. of water. After drying over sodium sulfate and removing solvent in vacuo, the red-brown crude product is purified by recrystallizing twice from methanol to give 4.6 g. of white crystals of 8-(4-p-fluorophenyl-4-oxobutyl)-3-oxo-1-thia-4,8-diazaspiro[4.5]decane, which melt at 139° to 142° C. Its hydrochloride (recrystallized from methanol) melts at 260° to 263° C. with decomposition.

EXAMPLE 2

To a stirred suspension of 17.5 g. of 4-methyl-3-oxo-1-thia-4,8-diazaspiro[4.5]decane hydrobromide in 400 ml. of methyl isobutyl ketone is added 3.2 g. of sodium methoxide, and then 7.1 g. of sodium carbonate, 10.9 g. of 4-fluorophenyl-4-oxobutyl chloride and 0.1 g. of potassium iodide are added. The whole is refluxed for 9 hours, 5 g. of sodium carbonate is added, and the whole is refluxed for further 40 hours. After cooling, filtering and concentrating in vacuo, the red-brown residue (about 11 g.) is dissolved in 25 ml. of benzene. The yellowish white crystals formed on adding 20 ml. of 10% hydrochloric acid are collected by filtration, washed with about 10 ml. of acetone and recrystallized from methanol to give 8.4 g. of white needles of 8-(4-p-fluorophenyl-4-oxo-butyl)-4-methyl-3-oxo-1-thia-4,8-diazaspiro[4.5]decane hydrochloride, which melt at 267° to 271° C. with decomposition.

EXAMPLE 3

To a solution of 10.5 g. of 3-oxo-4-p-tolyl-1-thia-4,8-diazaspiro[4.5]decane in 400 ml. of toluene are added 10 g. of triethylamine and 8 g. of phenacyl bromide, and the mixture is refluxed with stirring for 16 hours. After cooling, the precipitate is separated by filtration. This yellowish white precipitate contains the by-product triethylamine hydrobromide and the desired product. The filtrate is concentrated in vacuo. The resulting residue and the yellowish white precipitate are combined, 500 ml. of chloroform and 100 ml. of water are added thereto, and the whole is shaken. The chloroform layer is separated, washed with water, dried over sodium sulfate and concentrated in vacuo. Recrystallization of the obtained yellowish white crystals from ethanol-methanol (1:1) gives 12.4 g. of white needles of 3-oxo-8-phenacyl-4-p-tolyl-1-thia-4,8-diazaspiro[4.5]decane, melting at 215° to 217° C. Its hydrogen maleate (recrystallized from methanol) melts at 221° to 223° C.

EXAMPLES 4 TO 12

The following N-substituted piperidine spiro compounds are produced in the same manner as in Examples 1 to 3:

(4) 2-methyl - 3 - oxo-8-(4-phenyl-4-oxobutyl)-1-thia-4,8-diazaspiro[4.5]decane, melting at 161–163° C., and its hydrogen maleate, melting at 219° to 220° C. (decomposition) (recrystallized from 95% methanol), (5) 3-oxo-8-(4-p-tolyl - 4 - oxobutyl)-1-thia-4,8-diazaspiro[4.5]decane, melting at 149–151° C., and its hydrochloride, melting at 270° to 272° C. (decomposition) (from methanol), (6) 8 - (4-p-fluorophenyl - 4 - oxobutyl)-3-oxo-1-thia-4,8-diazaspiro[4.5]decane-1,1-dioxide hydrochloride, melting at 194° to 197° C. (from methanol), (7) 8-(4-p-fluorophenyl-4-oxobutyl)-3-oxo-4-p-tolyl-1-thiadiazaspiro[4.5]decane, melting at 161–163° C., and its hydrogen maleate, melting at 188° to 190° C. (from ethanol), (8) 9-(4-p-fluorophenyl - 4 - oxobutyl)-4-oxo-1-thia-5,9-diazaspiro[5.5]undecane, melting at 162–164° C., and its hydrogen maleate, melting at 204° to 205° C. (decomposition) (from methanol), (9) 8-(4-p-methoxyphenyl-4-oxobutyl) - 3 - oxo-1-thia-4,8-diazaspiro[4.5]decane, melting at 157–160° C., and its hydrogen maleate, melting at 177° to 179° C. (decomposition) (from ethanol),

(10) 3-oxo - 8 - phenacyl-4-m-trifluoromethylphenyl-1-thia-4,8-diazaspiro[4.5]decane hydrogen maleate, melting at 216° to 219° C. (decomposition) (from methanol),

(11) 4-p-chlorophenyl-3-oxo-8-phenacyl - 1 - thia-4,8-diazaspiro[4.5]decane hydrogen maleate, melting at 224° to 227° C. (decomposition) (from 90% aqueous methanol),

(12) 8-(4-p-fluorophenyl - 4 - oxobutyl)-3-oxo-1-thia-4,8-diazaspiro[4.5]decane-1-oxide hydrochloride, melting at 198° to 199° C. (from methanol).

What is claimed is:
1. A member selected from the group consisting of compounds of the formula

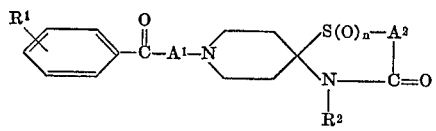

wherein $R^1$ is H, halogen, or alkyl or alkoxy of up to 3 carbon atoms, $R^2$ is H, alkyl of 1 to 4 carbon atoms, phenyl or substituted phenyl in which the substituent is selected from the group consisting of halogen, methyl and trifluoromethyl, $A^1$ is alkylene of 1 to 3 carbon atoms, $A^2$ is alkylene of 1 or 2 carbon atoms; and $n$ is 0, 1 or 2, and acid addition salts thereof.

2. A compound as claimed in claim 1, wherein the acid addition salt is the hydrochloride.

3. A compound as claimed in claim 1, where the acid addition salt is the hydrogen maleate.

4. A compound according to claim 1, namely 8-(4-p-fluorophenyl-4-oxobutyl)-3-oxo-1-thia - 4,8 - diazaspiro[4.5]decane.

5. A compound according to claim 1, namely 8-(4-p-fluorophenyl-4-oxobutyl)-4-methyl - 3 - oxo-1-thia-4,8-diazaspiro[4.5]decane hydrochloride.

6. A compound according to claim 1, namely 3-oxo-8-phenacyl-4-p-tolyl-1-thia-4,8-diazaspiro[4.5]decane.

7. A compound according to claim 1, namely 2-methyl-3 - oxo - 8 - (4-phenyl-4-oxobutyl)-1-thia-4,8-diazaspiro-[4.5]decane.

8. A compound according to claim 1, namely 3-oxo-8 - (4 - p - tolyl-4-oxobutyl)-1-thia-4,8-diazaspiro[4.5]-decane.

9. A compound according to claim 1, namely 8-(4-p-fluorophenyl - 4 - oxobutyl)-3-oxo-1-thia-4,8-diazaspiro-[4.5]decane-1,1-dioxide hydrochloride.

10. A compound according to claim 1, namely 8-(4-p-fluorophenyl - 4 - oxobutyl)-3-oxo-4-p-tolyl-1-thia-4,8-diazaspiro[4.5]decane.

11. A compound according to claim 1, namely 9-(4-p-fluorophenyl-4-oxobutyl)-4-oxo-1-thia - 5,9 - diazaspiro-[5.5]undecane.

12. A compound according to claim 1, namely 8-(4-p-methoxyphenyl - 4 - oxobutyl) - 3 - oxo-1-thia-4,8-diazaspiro[4.5]decane.

13. A compound according to claim 1, namely 3-oxo-8-phenacyl - 4 - m - trifluoromethylphenyl-1-thia-4,8-diazaspiro[4.5]decane hydrogen maleate.

14. A compound according to claim 1, namely 4-p-chlorophenyl - 3 - oxo - 8 - phenacyl-1-thia-4,8-diazaspiro[4.5]decane hydrogen maleate.

15. A compound according to claim 1, namely 8-(4-p-fluorophenyl - 4 - oxobutyl) - 3 - oxo-1-thia-4,8-diazaspiro[4.5]decane-1-oxide hydrochloride.

References Cited
UNITED STATES PATENTS 3,574,204    4/1971    Nakanishi et al. _____ 260—243

JOHN M. FORD, Primary Examiner

U.S. Cl. X.R.

260—293.4; 424—246, 267